April 21, 1964

R. METAILLER 3,129,832

MULTIPLE-PURPOSE POWER SHOVEL

Filed May 12, 1961

INVENTOR
ROGER METAILLER

By

OSTROLENK, FABER, GERB & SOFFEN
ATTORNEYS

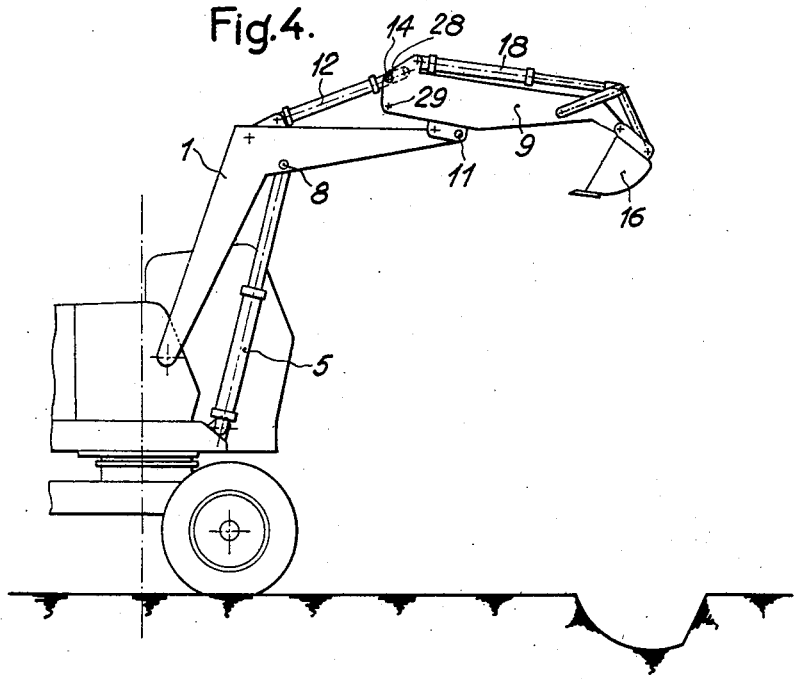
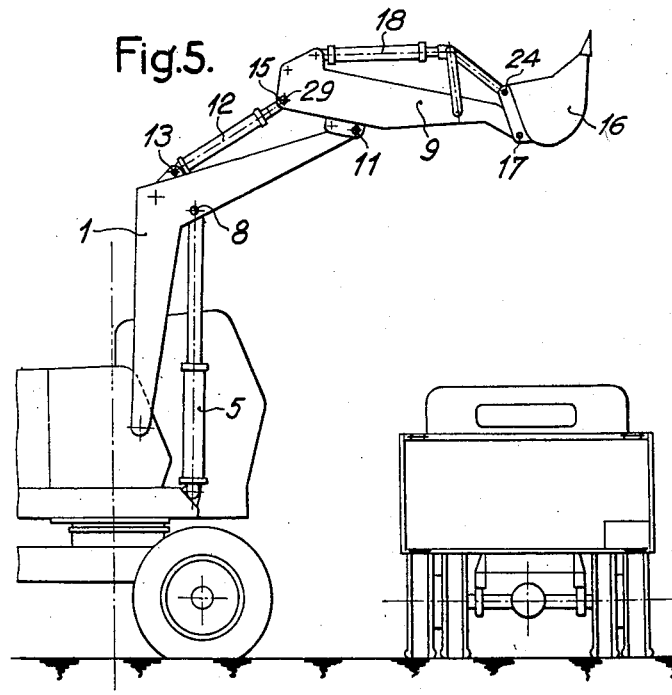

April 21, 1964 R. METAILLER 3,129,832
MULTIPLE-PURPOSE POWER SHOVEL
Filed May 12, 1961 6 Sheets-Sheet 3

INVENTOR
ROGER METAILLER
By
OSTROLENK, FABER, GERB & SOFFEN
ATTORNEYS

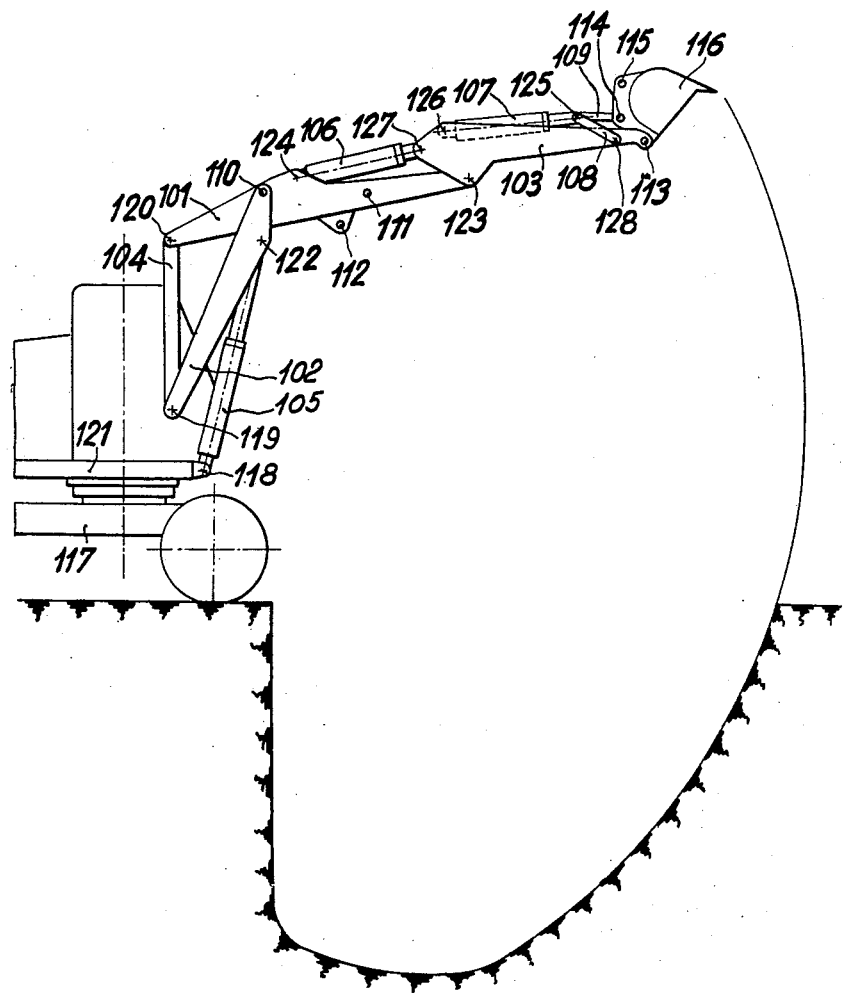

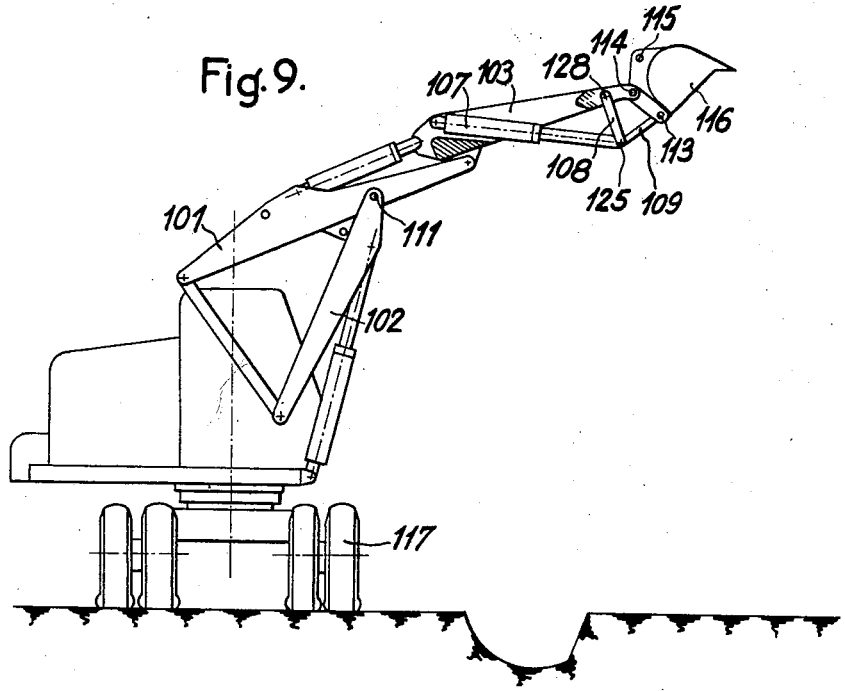
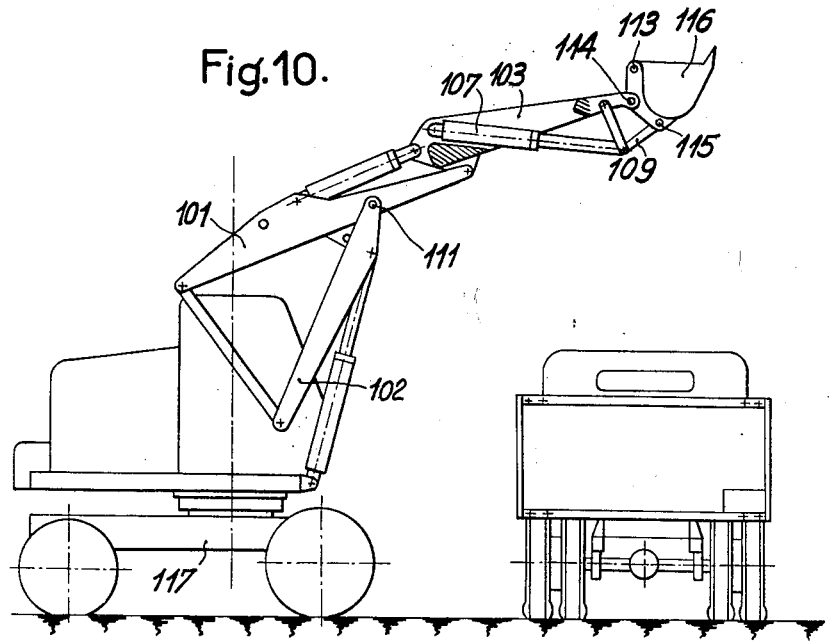

April 21, 1964     R. METAILLER     3,129,832
MULTIPLE-PURPOSE POWER SHOVEL

Filed May 12, 1961     6 Sheets-Sheet 6

INVENTOR
ROGER METAILLER
BY
OSTROLENK, FABER, GERB & SOFFEN
ATTORNEYS

United States Patent Office 3,129,832
Patented Apr. 21, 1964

3,129,832
MULTIPLE-PURPOSE POWER SHOVEL
Roger Metailler, Paris, France, assignor to Societe Auxiliaire de l'Entreprise (Auxen), Paris, France
Filed May 12, 1961, Ser. No. 109,613
Claims priority, application France May 18, 1960
2 Claims. (Cl. 214—138)

This invention relates to excavators or power shovels in general and has specific reference to an improved power shovel or self-powered digger for performing many types of public works which would otherwise require, with conventional machines and equipment, the successive use of excavators of several different types.

The power shovel according to this invention comprises a self-powered truck frame or undercarriage, a swivelling platform, a boom pivoted on the swivelling platform, a hydraulic or pneumatic cylinder reacting on said platform for controlling the boom inclination, a dipper arm or handle pivoted on the boom, another hydraulic or pneumatic cylinder reacting on said boom for controlling the dipper arm inclination, a dipper, bucket, or like tool pivoted on the outer end of said arm, and a third hydraulic or pneumatic cylinder reacting on said arm for actuating the dipper, grab, bucket or like digging or shovelling tool by causing same to pivot in relation to said arm, this power shovel being characterized in that these various elements are so designed that before performing each work these elements can easily and readily be so mounted as to provide a machine perfectly adapted for the specific job contemplated.

These different mountings are both simple and easy to make on the site without removing or disconnecting the hydraulic or pneumatic hoses or lines from the hydraulic or pneumatic cylinders mounted on the machine.

By properly combining the selection of the different specific element mountings with the selection of the tool proper to be mounted on the dipper arm, the power shovel of this invention can be converted with a view to impart the optimum characteristics corresponding to the excavation of trenches and drains, to the digging and clearing of ditches, to the shovelling of material from the dump with dippers, to the shovelling of material from the heap with grab buckets, and to the crowding, respectively.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

FIGURE 4 shows the machine equipped for digging or clearing ditches;

FIGURE 5 shows the machine with the equipment for shovelling up material by means of a dipper bucket;

FIGURES 8 to 11 illustrate another possible embodiment of the excavator of this invention for carrying out the same types of works respectively.

Figure 1:
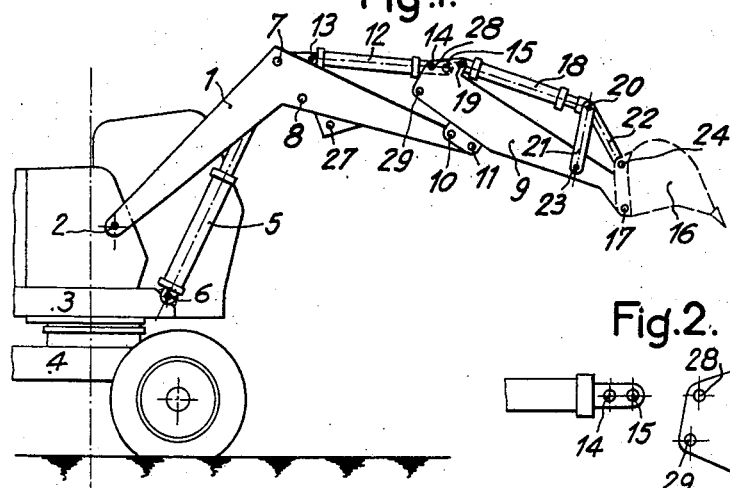
FIGURE 1 is a side elevational view showing the power shovel of this invention.
Figure 2:
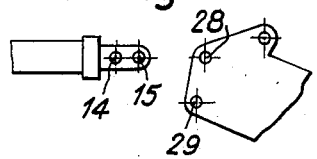
FIGURE 2 is a fragmentary view showing a detail on a larger scale.

Referring first to the power shovel illustrated in FIGS. 1 to 7 of the drawings, it will be seen that this machine is characterized in that the outer end of the piston rod of a first hydraulic or pneumatic cylinder 5 controlling the boom 1 may be pivotally connected to either of a pair of pivot pins 7 or 8 rigidly carried by the boom 1, that the dipper arm 9 may be pivotally connected to the outer end of the boom through either of a pair of pivot holes 28, 29 formed in this arm, and that the outer end of the piston rod of a second hydraulic or pneumatic cylinder 12 controlling the dipper arm carries a pair of transverse pivot pins 14, 15 one of which can be used for making a pivotal connection with either of the aforesaid pivot holes 28, 29 of arm 9.

As shown in FIG. 1, this excavator comprises a boom 1 pivotally mounted at 2 on the frame structure carried by the swivelling platform 3 adapted to revolve in a horizontal plane about a center pintle (not shown) of known design carried by the self-powered truck frame or undercarriage 4. The first hydraulic or pneumatic cylinder 5 is pivoted at 6 on the platform 3 and has the head or outer end of its piston rod pivotally connected through the pivot pins 7 or 8 to the boom 1 for controlling the luffing or angular movements of the boom about the axis 2. The boom 1 comprises a pivot pin 27 for operating the crowding equipment through the open bottom of the boom. The dipper arm or handle 9 is pivoted on the outer end of the boom 1 through either of pivot pins 10 or 11. The dipper arm motion is controlled through a second hydraulic or pneumatic cylinder 12 pivoted at 13 on the boom 1. The head or outer end of the piston rod of this cylinder 12 is provided (as shown notably in FIG. 2) with a pair of pivot pins 14, 15 adapted to be pivotally connected to holes 28 or 29 formed in the dipper arm 9. The tool proper, such as a dipper or bucket 16 is pivotally mounted on the outer end of arm 9 by means of a pivot pin 17. The bucket or dipper movements are controlled through a third hydraulic or pneumatic cylinder 18 pivotally connected at 19 on the dipper arm and attached at 20 on a pair of links 21, 22. Link 21 is pivoted on the dipper arm at 23 and link 22 is pivoted on the dipper or bucket proper 16 at 24.

Figure 3:
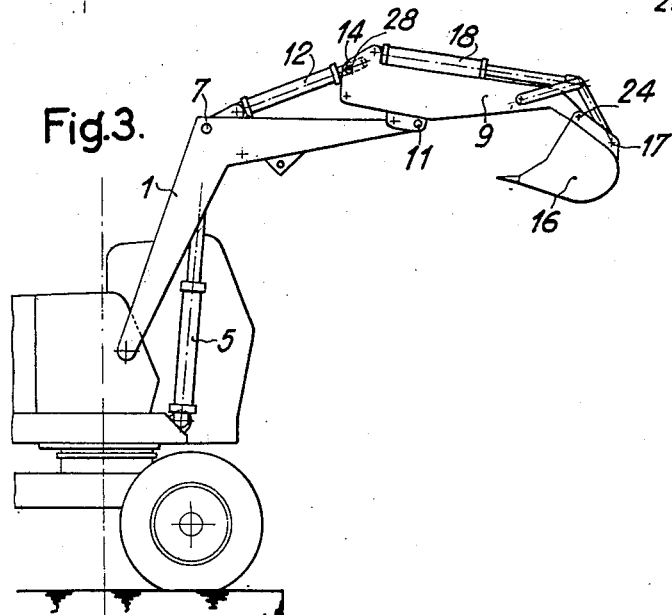
FIGURE 3 is a view similar to FIG. 1, showing the machine equipped for digging trenches or drains.

The optimum operating conditions for digging trenches or drains are obtained, as shown in FIG. 3, by attaching the cylinder 5 at 7 on the boom 1. The cylinder 12 is connected to arm 9 through its pivot pin 14 engaging the hole 28. The dipper arm 9 is pivoted at 11 on the boom 1. The tool or dipper 16 shown in FIG. 1 is a backhoe shovel controlled by the third cylinder 18. With this arrangement maximum trenching depth and dipper effort can be obtained.

The optimum working conditions for digging or clearing ditches are obtained, as illustrated in FIG. 4, by mounting the cylinder 5 at 8 on the boom 1. Cylinder 12 is connected to the arm 9 through its pivot pin 14 engaging the hole 28. The arm 9 is pivoted in turn on the boom 1 at 11. The tool 16, consisting in this case of a backhoe shovel of relatively wide type is controlled by the cylinder 18. With this arrangement, a considerable dumping height and a maximum shovel effort can be obtained.

The optimum operating conditions for shovelling up material from the heap are obtained, as shown in FIG. 5, by attaching the cylinder 5 at 8 on the boom. In this case, the cylinder 12 is attached to the arm 9 through its pivot pin 15 engaging the hole 29. The arm 9 is pivoted at 11 on the boom 1. The tool 16 consisting of the same backhoe shovel as in FIG. 2, but with the pivot pins 17 and 24 inverted in relation to this figure, is controlled by the third cylinder 18. With this arrangement a considerable dumping height and an efficient clearing of the shovel 16 can be obtained.

Figure 6:
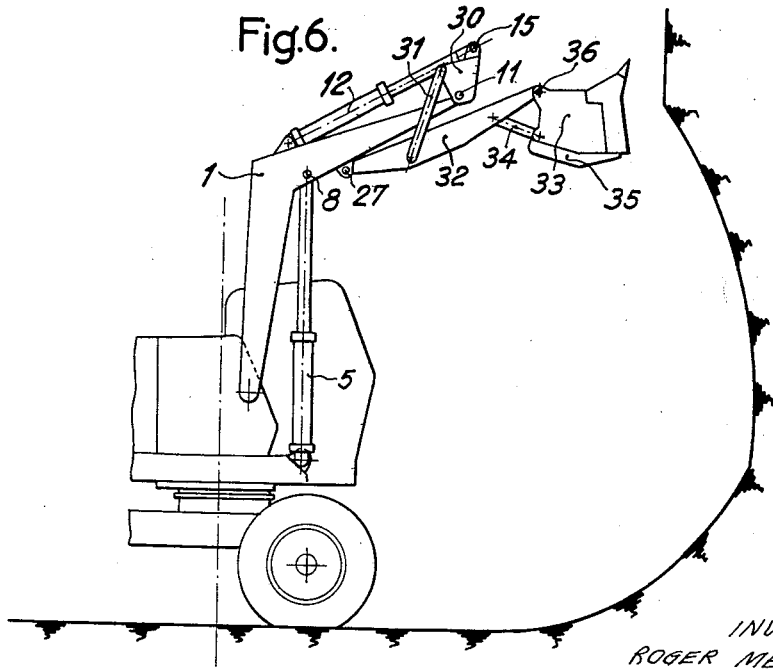
FIGURE 6 shows the machine equipped for crowd action.

The optimum operating conditions for crowd-action excavation are obtained, as shown in FIG. 6, by pivoting the cylinder 5 at 8 on the boom 1. The second cylinder 12 is pivoted at 15 on an intermediate member 30 pivoted at 11 on the outer end of the boom and connected through a link 31 to an arm 32. This arm 32 is pivoted at 27 on the boom 1 and its outer end carries at 36 the pivot pin of a bucket or dipper 33 connected through a link 34 to the arm 32. The bucket or dipper 33 is of the crowd-action type with a bottom opening equipped with a hinged flap 35. By operating the cylinders 5 and 12 a considerable dumping height can also be obtained together with a strong crowd action of the dipper or bucket.

Figure 7:
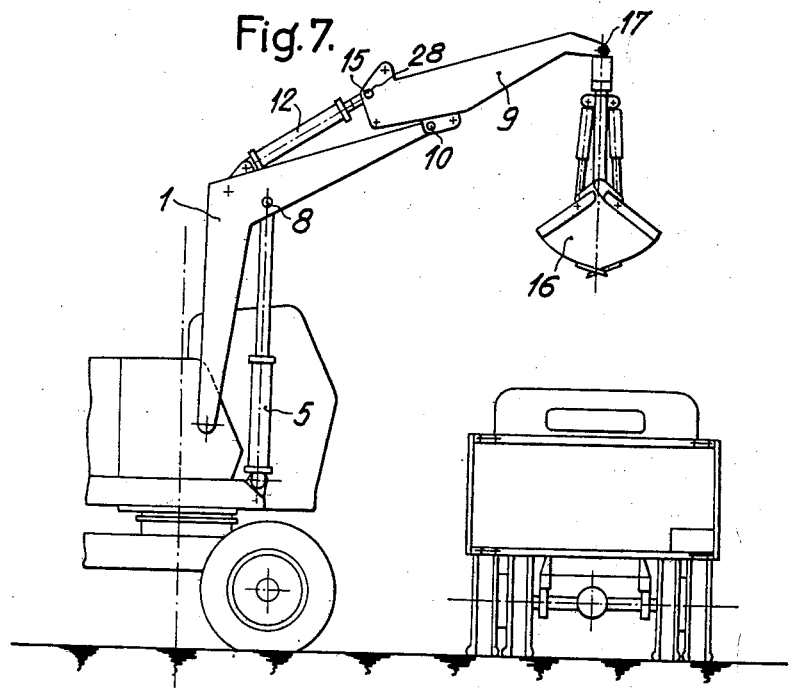
FIGURE 7 shows the machine equipped for shovelling up material from the heap by means of a grab bucket.

The optimum operating conditions for shovelling up material from the heap with a grab bucket are obtained with the arrangement shown in FIG. 7 wherein the first cylinder 5 is pivoted at 8 on the boom 1, the second cylinder 12 being pivoted on the arm 9 by engaging the pivot pin 15 into the holes 28 thereof. The arm 9 is pivoted at 10 on the boom. The tool 16 in this case consists of a grab bucket attached at 17 on the arm 9. If the preceding mounting comprises a cylinder 18 and links 21, 22, these elements may be left on the equipment without interfering with the operation of the grab bucket.

The machine illustrated in FIGS. 8 to 11 of the drawings is characterized in that the outer end or head of the piston rod of the cylinder 105 controlling the boom assembly 101, 102 and 104 is constantly pivoted on the same pivot pin 119, the same applying to the pivotal mounting of the arm 103 on the outer or upper end of the boom, and to the mounting of the head of the piston rod of cylinder 6 controlling the luffing motion of arm 103 by acting on the rear end of this arm.

As illustrated in FIG. 8, this machine comprises a boom consisting of a boom body 101 carried by a pair of supporting arms 104, 102 of unequal lengths. The first support 104 is pivoted at 120 on the body 101 on the one hand and at 119 on the swivelling platform on the other hand. The other support 102 is pivotally connected at 110 on element 101 and at 119 on the swivelling platform 121. According to this invention, this second support 102 may also be connected to the body 101 at 111 or 112, according to the type of work to be performed. The angular displacement of the boom assembly 101, 102, 104 about the axis 119 is controlled by the cylinder 105 pivoted in turn on the swivelling platform 121 at 118 and also on the second support 102 at 122. An arm 103 is pivoted on the outer end of the body 101 by means of a pivot pin 123. The movement of this arm 103 about the pivot pin 123 is controlled by a cylinder 106 pivoted on the body 101 at 124 and on the arm 103 at 127. In the assembly illustrated in FIG. 8, the tool 116 is a backhoe dipper or shovel pivoted on the outer end of arm 103 by means of a pivot pin 113. The movement of the backhoe dipper about the axis 113 is controlled by a cylinder 107 pivoted on the arm 103 at 126 and connected at 125 to the pair of links 108 and 109. The first link 108 is pivoted on the arm 103 at 128 and the other link 109 is pivoted on the dipper 116 at 114. According to this invention another pivotal connection 115 is provided on the dipper for effecting mountings other than that of FIG. 8.

The three-element boom assembly illustrated and described herein provides the following advantages:

(a) The efforts are regularly distributed among the three-elements of the triangular assembly with a consequent saving in weight;

(b) Simplicity of manufacture of these three elements;

(c) Simplicity of the operation for converting the mounting from one type to another, which requires only one disconnection and one reconnection;

(d) Possibility of using the same essential elements of the machine for all types of works, as it is only necessary to replace the digging tool with another tool for performing certain works.

It is another essential feature of this construction to provide an arm 103 consisting of two parallel arms between which is disposed a cylinder 107 controlling the movements of the tool 116 at the outer end of arm 103. The following advantages are derived from this original construction:

(1) Maximum value of the effort transmitted to the tool during the operation of the excavator;

(2) Fast return movement of the tool;

(3) Lateral protection of the piston rod of the control cylinder, which is particularly appreciable when clearing ditches and the like;

(4) Facility in changing the position of the cylinder from one to the other side of the arm.

Finally, by providing three possible pivotal mountings of the rear edge of the dipper, it is possible to mount the tool in the best angular position for the type of work contemplated.

In the mounting shown in FIG. 8 the excavator is equipped for operating as a drag shovel or trencher (backhoe) notably for excavating small trenches for water lines and the like, and also deeper trenches.

For digging trenches or clearing ditches the excavator of this invention is mounted as shown in FIG. 9, with the second support 102 of the boom body 101 attached at 111 on the body 101.

In this mounting the third cylinder 107 extends downwards between the two lateral members constituting the arm 103, and the link 108 is directed downwards by oscillating about the pivot pin 128 carried by the arm 103. The dipper 116 is connected through the pivot pin 114 to the arm 103 and the link 109 is disposed between the pivot pin 125 and the pivot pin 113 of dipper 116. With this arrangement the rear edge of the dipper is free and it is possible to dig or work at ground level in close vicinity of the carrier frame 117.

For operating the shovel as a luffing shovel the machine is mounted as shown in FIG. 10, the second support 102 of the body assembly remaining connected at 111 to the body 101. The cylinder 107 is also kept in the position shown in FIG. 9. The dipper 116 is turned upside down and connected to the arm 103 through the medium of the pivot pin 114. The link 109 is connected at 115 on the dipper instead of being connected at 113 as in FIG. 9. The pivotal connection 113 of the tool remains inoperative.

Figure 11:
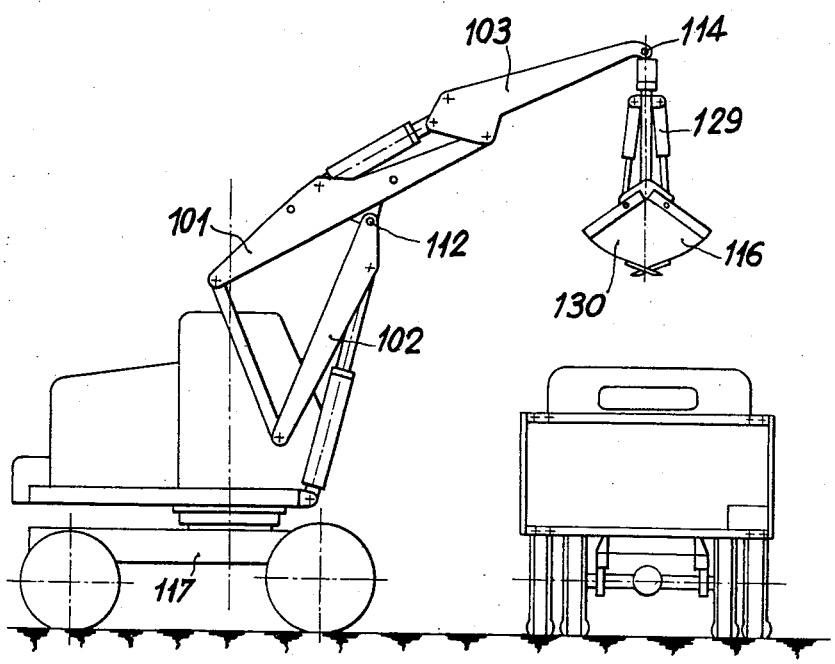

For shovelling up material from the heap by means of a grab bucket the machine is mounted as shown in FIG. 11. The second support 102 of the boom body is connected at 112 on the body 101. The cylinder 7 and both links 108 and 109 are removed. The tool 116 consisting of a grab bucket is suspended directly from the outer end of arm 103. This grab bucket comprises as in known arrangements one or more hydraulic or pneumatic cylinders 129 for closing and opening the jaws 130. The hydraulic hose circuit left inoperative by the removal of cylinder 7 is used for operating the cylinders 129.

Although the present invention has been described in conjunction with preferred embodiments, it is to be understood that modifications and variations may be resorted to without departing from the spirit and scope of the invention, as those skilled in the art will readily understand. Such modifications are considered to be within the purview and scope of the invention and appended claims.

What I claim is:

1. A multiple purpose power shovel comprising
   (a) a self-powered frame structure;
   (b) a rotary platform;
   (c) a compound boom structure including
       (i) a mounting link having one end pivoted at one point of said platform,
       (ii) a boom arm having one end pivoted on said mounting link and a plurality of control pivots positioned intermediate said one end and the opposite end of said arm, and
  (iii) a boom structure control link having one end pivoted on said platform at the same point as said one end of said mounting link and an opposite end pivoted to one of said control pivots on said boom arm, the mounting link, the boom arm and the boom structure control link defining a triangular compound boom structure;
(d) a fluid actuated cylinder for controlling said boom structure, said fluid actuated cylinder having one bearing end pivoted on said platform and an operative end pivoted on said boom structure control link;
(e) an operating arm having a pair of branch members pivoted on said opposite end of the boom arm;
(f) an arm control cylinder having one bearing end pivoted on said boom arm and an operative end pivoted between the two branch members of said operating arm;
(g) a shovelling bucket pivotally supported by said operating arm; and
(h) a bucket control cylinder disposed between said two branch members of said operating arm and having a bearing end pivoted between said two branch members and an operative end for actuating said bucket.

2. A multiple purpose power shovel as defined in claim 1, in which the operative end of said bucket control cylinder is connected to a pair of links, the first of which is pivoted to the operating arm adjacent said shovelling bucket and the second of which links is pivoted to said bucket.

References Cited in the file of this patent
UNITED STATES PATENTS

| | | |
|---|---|---|
| 1,371,344 | Brackett | Mar. 15, 1921 |
| 2,927,706 | Mork | Mar. 8, 1960 |
| 3,018,010 | Przybylski | Jan. 23, 1962 |
| 3,021,023 | Soyland | Feb. 13, 1962 |

FOREIGN PATENTS

| | | |
|---|---|---|
| 547,110 | Canada | Oct. 8, 1957 |
| 777,442 | Great Britain | June 26, 1957 |
| 1,157,133 | France | Dec. 23, 1957 |

OTHER REFERENCES

Germany (printed application), 1,071,601, Dec. 17, 1959.